(12) United States Patent            (10) Patent No.:     US 10,339,594 B2
     Liao                            (45) Date of Patent:        Jul. 2, 2019

(54) TOUCH SENSATION INTERACTION METHOD AND APPARATUS IN SHOPPING

(71) Applicant: Huawei Technologies Co., Ltd., Shenzhen (CN)

(72) Inventor: Heng Liao, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 421 days.

(21) Appl. No.: 15/229,856

(22) Filed: Aug. 5, 2016

(65) Prior Publication Data

US 2016/0343067 A1    Nov. 24, 2016

Related U.S. Application Data

(63) Continuation of application No. PCT/CN2014/090015, filed on Oct. 31, 2014.

(30) Foreign Application Priority Data

Feb. 7, 2014 (CN) .......................... 2014 1 0044917

(51) Int. Cl.
    *G06Q 99/00* (2006.01)
    *G06F 3/01* (2006.01)
    (Continued)

(52) U.S. Cl.
    CPC ......... *G06Q 30/0643* (2013.01); *G06F 3/016* (2013.01); *G06Q 30/00* (2013.01);
    (Continued)

(58) Field of Classification Search
    None
    See application file for complete search history.

(56) References Cited

U.S. PATENT DOCUMENTS 6,550,149 B2 * 4/2003 Dowdell .................. A43D 1/02
                                                      33/512
7,259,761 B2   8/2007 Shih et al.
                   (Continued)

FOREIGN PATENT DOCUMENTS

CN    102890805 A    1/2013
CN    103226783 A    7/2013
                   (Continued)

OTHER PUBLICATIONS

Cooper, S., "High-Tech Retail Will Revolutionize Shopping; Forget Change Rooms and Long Lineups—Breakthroughs in Apps Promise a Brave New World for Stores and Customers Alike," Vancouver Sun, p. A9, Vancouver, British Columbia, Aug. 14, 2012.*
(Continued)

*Primary Examiner* — Nicholas D Rosen
(74) *Attorney, Agent, or Firm* — Conley Rose, P.C.

(57) ABSTRACT

Embodiments of the present disclosure provide a touch sensation interaction method and apparatus in shopping. The method includes collecting an image of a first object, where the first object is a part of a human body, acquiring information about a second object, where the second object is a wearable item worn by the first object, obtaining parameter information of a touch sensation signal using the image of the first object and the information about the second object, where the touch sensation signal is applied to the first object and is used to simulate a touch sensation caused by the second object to the first object when the second object is worn by the first object, generating the touch sensation signal using the parameter information of the touch sensation signal, and applying the touch sensation signal to the first object.

16 Claims, 3 Drawing Sheets

(51) Int. Cl.
*G06Q 30/06* (2012.01)
*G06Q 30/00* (2012.01)
(52) U.S. Cl.
CPC ........ *G06Q 30/06* (2013.01); *G06Q 30/0601* (2013.01); *G06Q 99/00* (2013.01)

(56) References Cited

U.S. PATENT DOCUMENTS

| | | | |
|---|---|---|---|
| 7,958,016 B2 | 6/2011 | Huaulme et al. | |
| 8,525,828 B1* | 9/2013 | Bates | G06T 17/00 345/419 |
| 8,655,053 B1* | 2/2014 | Hansen | G06Q 10/10 382/154 |
| 8,908,928 B1* | 12/2014 | Hansen | G06K 9/00362 382/111 |
| 9,098,873 B2* | 8/2015 | Geisner | G06F 3/017 |
| 9,477,980 B2* | 10/2016 | Zagel | G06K 9/00369 |
| 9,811,854 B2* | 11/2017 | Lucido | G06Q 30/0643 |
| 10,089,680 B2* | 10/2018 | Lin | G06Q 30/0643 |
| 2002/0157266 A1* | 10/2002 | Dowdell | A43D 1/02 33/6 |
| 2007/0018973 A1* | 1/2007 | Shih | G06F 3/016 345/419 |
| 2008/0172308 A1* | 7/2008 | Huaulme | G06Q 30/0601 705/26.63 |
| 2011/0121953 A1* | 5/2011 | Grant | A63F 13/245 340/407.1 |
| 2011/0246329 A1* | 10/2011 | Geisner | G06F 3/017 705/27.1 |
| 2012/0223880 A1* | 9/2012 | Birnbaum | G06F 3/015 345/156 |
| 2013/0181913 A1 | 7/2013 | Cole et al. | |
| 2014/0249961 A1* | 9/2014 | Zagel | G06K 9/00369 705/26.61 |
| 2014/0282137 A1* | 9/2014 | Lin | G06Q 30/0643 715/765 |
| 2015/0106241 A1* | 4/2015 | Lucido | G06Q 30/0643 705/27.2 |

FOREIGN PATENT DOCUMENTS

| | | |
|---|---|---|
| CN | 103761670 A | 4/2014 |
| JP | 2001319108 A | 11/2001 |
| KR | 20050055248 A | 6/2005 |

OTHER PUBLICATIONS

U.S. Appl. No. 61/842,020, filed with the U.S. Patent Office Jul. 2, 2013.*
Anon., "Recent Findings in Textile Research Described by Researchers from the University of Minnesota," Journal of Engineering [Atlanta], Feb. 6, 2013: 6624. (Year: 2013).*
Machine Translation and Abstract of Chinese Publication No. CN102890805, Jan. 23, 2013, 5 pages.
Machine Translation and Abstract of Chinese Publication No. CN103761670, Apr. 30, 2014, 3 pages.
Foreign Communication From a Counterpart Application, PCT Application No. PCT/CN2014/090015, English Translation of International Search Report dated Jan. 21, 2015, 2 pages.
Foreign Communication From a Counterpart Application, PCT Application No. PCT/CN2014/090015, English Translation of Written Opinion dated Jan. 21, 2015, 12 pages.

* cited by examiner

TOUCH SENSATION INTERACTION METHOD AND APPARATUS IN SHOPPING

CROSS-REFERENCE TO RELATED APPLICATIONS

This application is a continuation of International Application No. PCT/CN2014/090015, filed on Oct. 31, 2014, which claims priority to Chinese Patent Application No. 201410044917.1, filed on Feb. 7, 2014, both of which are hereby incorporated by reference in their entireties.

TECHNICAL FIELD

The present disclosure relates to the field of computer field, and provides a touch sensation interaction method and apparatus in shopping.

BACKGROUND

In a modern shopping mall, a somatosensory dressing mirror has appeared. The somatosensory dressing mirror takes a picture of a user, and combines clothes selected by the user to the taken picture of the user. The somatosensory dressing mirror can simplify a purchasing procedure of a purchaser, reduce a purchasing time, reduce damage to clothes of sellers that is caused by a fitting, reduce work of a shopping guide, and improve working efficiency of the shopping guide.

However, the somatosensory dressing mirror does not have an ideal effect for purchasing of items on which high user comfort is required, such as shoes. For purchasing of shoes, not only does a foot fitting effect of the shoes need to be considered, but also a comfort degree of the shoes needs to be considered. However, it cannot be implemented using only the somatosensory dressing mirror.

SUMMARY

Embodiments of the present disclosure provide a touch sensation interaction method and apparatus in shopping to provide a virtual touch sensation in shopping and improve shopping efficiency.

According to a first aspect, an embodiment of the present disclosure provides a touch sensation interaction method in shopping, where the method includes collecting an image of a first object, where the first object is a part of a human body, acquiring information about a second object, where the second object is a wearable item worn by the first object, obtaining parameter information of a touch sensation signal using the image of the first object and the information about the second object, where the touch sensation signal is applied to the first object and is used to simulate a touch sensation caused by the second object to the first object when the second object is worn by the first object, and generating the touch sensation signal using the parameter information of the touch sensation signal, and applying the touch sensation signal to the first object.

In a first implementation manner of the first aspect, the generating parameter information of a touch sensation signal using the image of the first object and the information about the second object includes obtaining a model function of the first object using the image of the first object, obtaining a model function of the second object using the information about the second object, and obtaining through calculation, using the model function of the first object and the model function of the second object and using a model matching algorithm, a function representing the touch sensation signal.

With reference to the first aspect or the first implementation manner of the first aspect, in a second implementation manner of the first aspect, the generating parameter information of a touch sensation signal using the image of the first object and the information about the second object includes acquiring through scanning, using the image of the first object, lengths of the first object in all directions and at all positions in three-dimensional space, acquiring, using the information about the second object, lengths of the second object in all directions and at all positions in the three-dimensional space, and separately comparing the lengths of the first object in all the directions and at all the positions in the three-dimensional space with the lengths of the second object in all the directions and at all the positions in the three-dimensional space, and determining to obtain direction and position information and a length difference amplitude when the length of the second object is less than or equal to the length of the first object, to generate the parameter information of the touch sensation signal, where the parameter information of the touch sensation signal includes a position, an amplitude, and a direction of the touch sensation signal.

With reference to the first aspect or either of the foregoing implementation manners of the first aspect, in a third implementation manner of the first aspect, the generating parameter information of a touch sensation signal using the image of the first object and the information about the second object includes acquiring through scanning, using the image of the first object, lengths of the first object in a key direction and at a key position in three-dimensional space, acquiring, using the information about the second object, lengths of the second object in all directions and at all positions in the three-dimensional space, and separately comparing the lengths of the first object in the key direction and at the key position in the three-dimensional space with lengths of the second object in a key direction and at a key position of length, width, and height, and determining to obtain direction and position information and a length difference amplitude when the length of the second object is less than or equal to the length of the first object, to generate the parameter information of the touch sensation signal, where the parameter information of the touch sensation signal includes a position, an amplitude, and a direction of the touch sensation signal.

With reference to the first aspect or any one of the foregoing implementation manners of the first aspect, in a fourth implementation manner of the first aspect, the generating the touch sensation signal using the parameter information of the touch sensation signal, and applying the touch sensation signal to the first object includes generating the touch sensation signal using the parameter information of the touch sensation signal, and applying the touch sensation signal to the first object using a touch sensation generation apparatus.

With reference to the first aspect or any one of the foregoing implementation manners of the first aspect, in a fifth implementation manner of the first aspect, the first object is a foot, the second object is a shoe, and the touch sensation generation apparatus is a foot strap apparatus.

With reference to the first aspect or any one of the foregoing implementation manners of the first aspect, in a sixth implementation manner of the first aspect, the first object is a hand, the second object is a glove, and the touch sensation generation apparatus is a glove apparatus.

With reference to the first aspect or any one of the foregoing implementation manners of the first aspect, in a seventh implementation manner of the first aspect, the first object is a head, the second object is a hat, and the touch sensation generation apparatus is a hat apparatus.

With reference to the first aspect or any one of the foregoing implementation manners of the first aspect, in an eighth implementation manner of the first aspect, the touch sensation generation apparatus includes a touch sensation signal contact surface and a touch sensation simulation module, and the applying the touch sensation signal to the first object using a touch sensation generation apparatus includes generating through simulation, by the touch sensation simulation module, the touch sensation signal according to a parameter of the touch sensation signal, and applying, using the touch sensation signal contact surface, the touch sensation signal to an object to which a touch sensation is applied.

With reference to the first aspect or any one of the foregoing implementation manners of the first aspect, in a ninth implementation manner of the first aspect, the generating the touch sensation signal using the parameter information of the touch sensation signal, and applying the touch sensation signal to the first object includes generating the touch sensation signal using the parameter information of the touch sensation signal, and applying the touch sensation signal to the first object using an ultrasonic wave generation apparatus.

With reference to the first aspect or any one of the foregoing implementation manners of the first aspect, in a tenth implementation manner of the first aspect, the image of the first object includes two-dimensional images, collected from multiple angles, of the first object, or a depth map of the first object.

According to a second aspect, an embodiment of the present disclosure provides a touch sensation interaction apparatus in shopping, where the apparatus includes an image collection module, an information acquiring module, a touch sensation parameter generating module, and a touch sensation applying module, where the image collection module is configured to collect an image of a first object, where the first object is a part of a human body, the information acquiring module is configured to acquire information about a second object, where the second object is a wearable item worn by the first object, the touch sensation parameter generating module is configured to obtain parameter information of a touch sensation signal using the image of the first object and the information about the second object, where the touch sensation signal is applied to the first object and is used to simulate a touch sensation caused by the second object to the first object when the second object is worn by the first object, and the touch sensation applying module is configured to generate the touch sensation signal using the parameter information of the touch sensation signal, and apply the touch sensation signal to the first object.

In a first implementation manner of the second aspect, the touch sensation parameter generating module is configured to obtain a model function of the first object using the image of the first object, obtain a model function of the second object using the information about the second object, and obtain through calculation, using the model function of the first object and the model function of the second object and using a model matching algorithm, a function representing the touch sensation signal.

With reference to the second aspect or the first implementation manner of the second aspect, in a second implementation manner of the second aspect, the touch sensation parameter generating module is configured to acquire through scanning, using the image of the first object, lengths of the first object in all directions and at all positions in three-dimensional space, acquire, using the information about the second object, lengths of the second object in all directions and at all positions in the three-dimensional space, and separately compare the lengths of the first object in all the directions and at all the positions in the three-dimensional space with the lengths of the second object in all the directions and at all the positions in the three-dimensional space, and determine to obtain direction and position information and a length difference amplitude when the length of the second object is less than or equal to the length of the first object, to generate the parameter information of the touch sensation signal, where the parameter information of the touch sensation signal includes a position, an amplitude, and a direction of the touch sensation signal.

With reference to the second aspect or either of the foregoing implementation manners of the second aspect, in a third implementation manner of the second aspect, the touch sensation parameter generating module is configured to acquire through scanning, using the image of the first object, lengths of the first object in a key direction and at a key position in three-dimensional space, acquire, using the information about the second object, lengths of the second object in all directions and at all positions in the three-dimensional space, and separately compare the lengths of the first object in the key direction and at the key position in the three-dimensional space with lengths of the second object in a key direction and at a key position of length, width, and height, and determine to obtain direction and position information and a length difference amplitude when the length of the second object is less than or equal to the length of the first object, to generate the parameter information of the touch sensation signal, where the parameter information of the touch sensation signal includes a position, an amplitude, and a direction of the touch sensation signal.

With reference to the second aspect or any one of the foregoing implementation manners of the second aspect, in a fourth implementation manner of the second aspect, the touch sensation applying module is configured to generate the touch sensation signal using the parameter information of the touch sensation signal, and apply the touch sensation signal to the first object using a touch sensation generation apparatus.

With reference to the second aspect or any one of the foregoing implementation manners of the second aspect, in a fifth implementation manner of the second aspect, the first object is a foot, the second object is a shoe, and the touch sensation generation apparatus is a foot strap apparatus.

With reference to the second aspect or any one of the foregoing implementation manners of the second aspect, in a sixth implementation manner of the second aspect, the first object is a hand, the second object is a glove, and the touch sensation generation apparatus is a glove apparatus.

With reference to the second aspect or any one of the foregoing implementation manners of the second aspect, in a seventh implementation manner of the second aspect, the first object is a head, the second object is a hat, and the touch sensation generation apparatus is a hat apparatus.

With reference to the second aspect or any one of the foregoing implementation manners of the second aspect, in an eighth implementation manner of the second aspect, the touch sensation generation apparatus includes a touch sensation signal contact surface and a touch sensation simulation module, where the touch sensation simulation module generates through simulation the touch sensation signal according to a parameter of the touch sensation signal, and applies, using the touch sensation signal contact surface, the touch sensation signal to an object to which a touch sensation is applied.

With reference to the second aspect or any one of the foregoing implementation manners of the second aspect, in a ninth implementation manner of the second aspect, the touch sensation generation apparatus includes generating the touch sensation signal using the parameter information of the touch sensation signal, and applying the touch sensation signal to the first object using an ultrasonic wave generation apparatus.

With reference to the second aspect or any one of the foregoing implementation manners of the second aspect, in a tenth implementation manner of the second aspect, the image of the first object includes two-dimensional images, collected from multiple angles, of the first object, or a depth map of the first object.

According to a third aspect, an embodiment of the present disclosure provides a touch sensation interaction computer system in shopping, where the computer system includes a bus, a processor, a memory, and an input/output device, where the processor, the memory, and the input/output device are connected using the bus, the memory is configured to store data and code, the processor is coupled with the memory, and implements the following method by invoking the data and code in the memory collecting an image of a first object, where the first object is a part of a human body, acquiring information about a second object, where the second object is a wearable item worn by the first object, obtaining parameter information of a touch sensation signal using the image of the first object and the information about the second object, where the touch sensation signal is applied to the first object and is used to simulate a touch sensation caused by the second object to the first object when the second object is worn by the first object, and generating the touch sensation signal using the parameter information of the touch sensation signal, and applying the touch sensation signal to the first object.

In the embodiments of the present disclosure, a part of an image of a purchaser is collected, information about a wearable item for purchasing is acquired, a signal that simulates a touch sensation when the wearable item is worn by the purchaser is generated, and the touch sensation signal is applied to the purchaser. In the embodiments of the present disclosure, the image of the purchaser is collected, the purchaser does not need to wear the item for purchasing, and a signal that simulates a touch sensation is generated. A purchasing procedure of the purchaser is simplified, and damage to the item for purchasing is reduced.

DESCRIPTION OF EMBODIMENTS

With development of communications technologies and electronic shopping, online shopping has become increasingly popular. At present, in online shopping, text and image information related to a product are mainly transmitted, but with an increase in a network bandwidth and intelligentization of a collection device, in online shopping, information of more dimensions can be transmitted, which not only includes text and image information, but also will include video information, audio information, touch sensation information, and olfactory information. Especially, in purchasing of a wearable item, including clothes and shoes, in electronic commerce, not only image and text information of a product for purchasing need to be transmitted, but also a wearing effect of the wearable item needs to be transmitted using a video. The wearing effect includes a wearing effect when the clothes are worn, whether a size fits, and whether a color matches a skin color, and for remote purchasing of products such as shoes and gloves, further includes a simulated pressure touch sensation when such type of items are worn by a purchaser.

Figure 1:
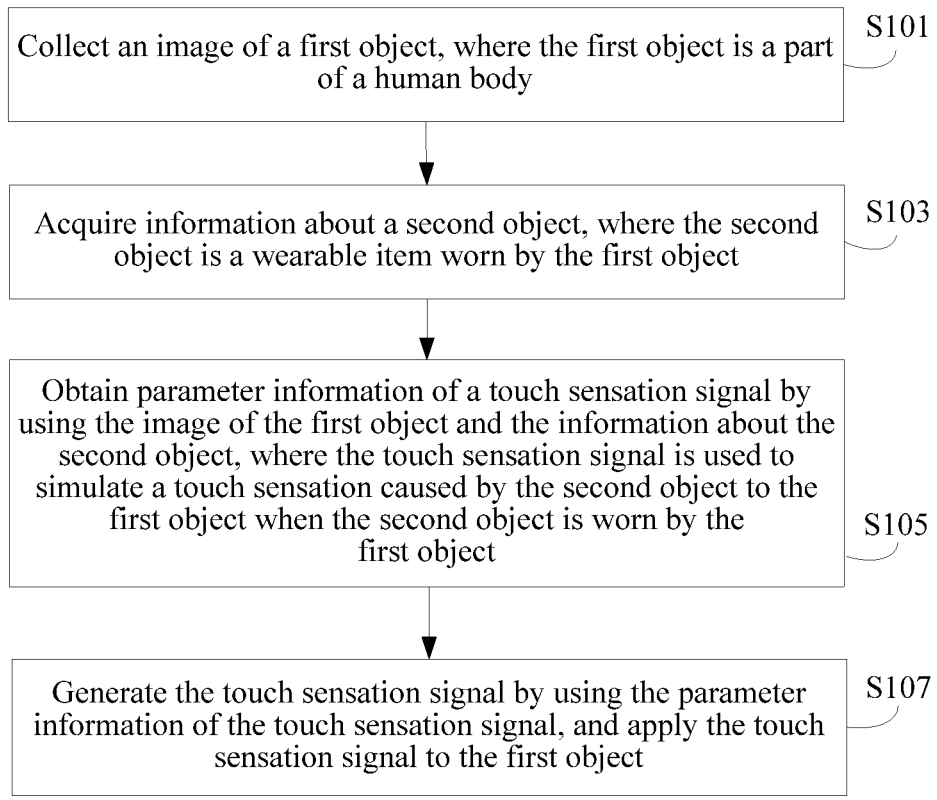
FIG. 1 is a flowchart of an embodiment of a touch sensation interaction method in shopping according to the present disclosure.

An embodiment of the present disclosure provides a touch sensation interaction method in shopping. FIG. 1 provides a flowchart of an embodiment of a touch sensation interaction method in shopping according to the present disclosure. The method includes the following steps.

S101: Collect an image of a first object, where the first object is a part of a human body.

S103: Acquire information about a second object, where the second object is a wearable item worn by the first object.

S105: Obtain parameter information of a touch sensation signal using the image of the first object and the information about the second object, where the touch sensation signal is applied to the first object and is used to simulate a touch sensation caused by the second object to the first object when the second object is worn by the first object.

S107: Generate the touch sensation signal using the parameter information of the touch sensation signal, and apply the touch sensation signal to the first object.

The touch sensation signal is a pressure touch sensation signal.

In an embodiment of the present disclosure, the second object is a wearable item of a shopping mall, such as a shoe, a glove, a hat, clothes, or the like. The information about the second object includes a product name, a product code, model number, or the like. The information about the second object may also be a picture, taken using a camera, of the second object.

Figure 2:
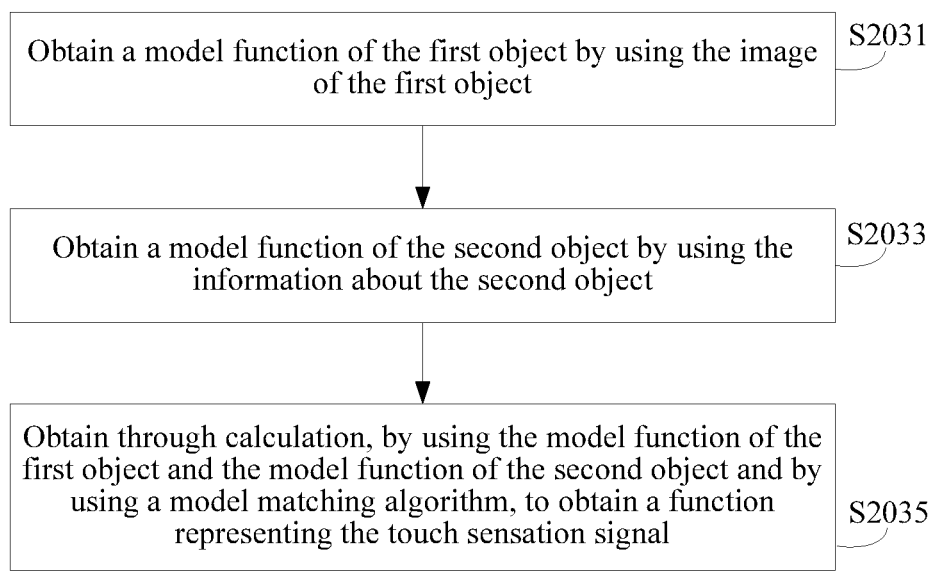
FIG. 2 is a flowchart of an embodiment of generating a parameter of a touch sensation signal according to the present disclosure.

In an embodiment of the present disclosure, an embodiment of generating a parameter of the touch sensation signal is provided. As shown in FIG. 2, FIG. 2 provides a flowchart of an embodiment of generating a parameter of the touch sensation signal. The generating parameter information of a touch sensation signal using the image of the first object and the information about the second object includes the following:

S2031: Obtain a model function of the first object using the image of the first object.

S2033: Obtain a model function of the second object using the information about the second object.

S2035: Obtain through calculation, using the model function of the first object and the model function of the second object and using a model matching algorithm, a function representing the touch sensation signal.

In an embodiment of the present disclosure, the model function of the first object is obtained using the image of the first object in a manner of mathematical modeling, and the model function of the second object is obtained using the information about the second object in a manner of mathematical modeling. The manner of mathematical modeling includes, but is not limited to, an iterative algorithm and a convex function method.

Figure 3:
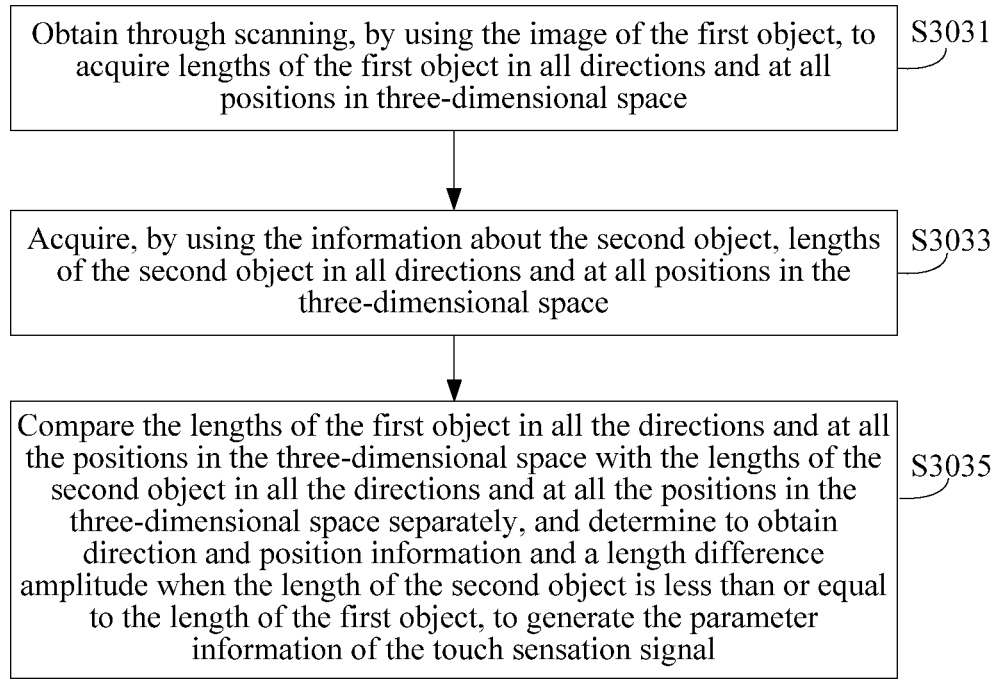
FIG. 3 is a flowchart of another embodiment of generating a parameter of a touch sensation signal according to the present disclosure.

In an embodiment of the present disclosure, another embodiment of generating a parameter of the touch sensation signal is provided. FIG. 3 provides a flowchart of an embodiment of generating a parameter of the touch sensation signal. The generating parameter information of a touch sensation signal using the image of the first object and the information about the second object includes the following:

S3031: Acquire through scanning, using the image of the first object, lengths of the first object in all directions and at all positions in three-dimensional space.

S3033: Acquire, using the information about the second object, lengths of the second object in all directions and at all positions in the three-dimensional space.

S3035: Separately compare the lengths of the first object in all the directions and at all the positions in the three-dimensional space with the lengths of the second object in all the directions and at all the positions in the three-dimensional space, and determine to obtain direction and position information and a length difference amplitude when the length of the second object is less than or equal to the length of the first object to generate the parameter information of the touch sensation signal, where the parameter information of the touch sensation signal includes a position, an amplitude, and a direction of the touch sensation signal.

In an embodiment of the present disclosure, a direction when the length of the second object is less than or equal to the length of the first object is a direction of the touch sensation signal, a position when the length of the second object is less than or equal to the length of the first object is a position of the touch sensation signal, and a difference between the length of the second object and the length of the first object is in equal proportion to an amplitude of the touch sensation signal, a larger length difference indicates a larger amplitude of the touch sensation signal, and a smaller length difference indicates a smaller amplitude of the touch sensation signal.

In an embodiment of the present disclosure, the three-dimensional space corresponds to real physical space, and may be determined according to a preset rule, or may be established with reference to the first object, or be established with reference to the second object. The three-dimensional space may be a three-dimensional rectangular coordinate, a three-dimensional polar coordinate, or the like.

In an embodiment of the present disclosure, comparing the lengths of the first object in all the directions and at all the positions in the three-dimensional space with the lengths of the second object in all the directions and at all the positions in the three-dimensional space separately includes separately comparing, using a computer, the lengths of the first object in all the directions and at all the positions in the three-dimensional space with lengths of the second object in directions and at positions in the three-dimensional space, where the directions and the positions correspond to the directions and positions of the first object. All the directions of the first object in the three-dimensional space include directions of the first object in length, width, and height of the first object, and the lengths of the first object in all the directions and at all the positions in the three-dimensional space include lengths of the first object in length, width, and height directions and at all different positions in the three-dimensional space. For example, the first object is in a specific length direction in the three-dimensional space, 1 millimeter (mm) is used as an interval in width and height directions, and lengths of the first object and the second object at corresponding positions are compared separately.

Figure 4:
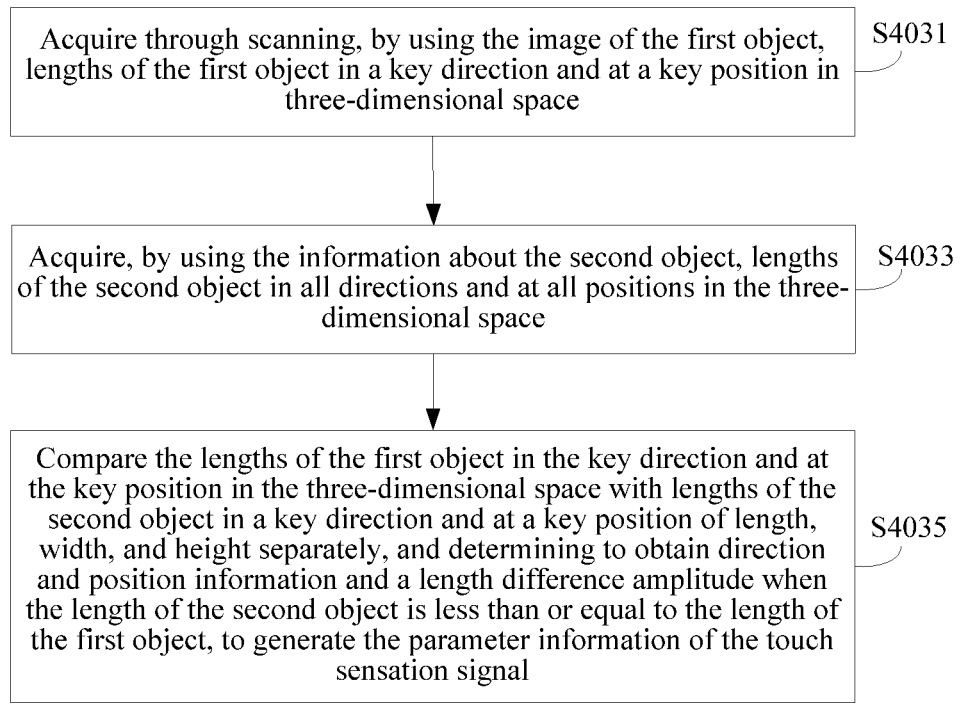
FIG. 4 is a flowchart of still another embodiment of generating a parameter of a touch sensation signal according to the present disclosure.

In an embodiment of the present disclosure, still another embodiment of generating a parameter of the touch sensation signal is provided. FIG. 4 provides a flowchart of an embodiment of generating a parameter of the touch sensation signal. Generating parameter information of a touch sensation signal using the image of the first object and the information about the second object includes S4031: Acquiring through scanning, using the image of the first object, lengths of the first object in a key direction and at a key position in three-dimensional space.

S4033: Acquiring, using the information about the second object, lengths of the second object in all directions and at all positions in the three-dimensional space.

S4035: Separately comparing the lengths of the first object in the key direction and at the key position in the three-dimensional space with lengths of the second object in a key direction and at a key position of length, width, and height, and determining to obtain direction and position information and a length difference amplitude when the length of the second object is less than or equal to the length of the first object, to generate the parameter information of the touch sensation signal, where the parameter information of the touch sensation signal includes a position, an amplitude, and a direction of the touch sensation signal.

In an embodiment of the present disclosure, the key direction in the three-dimensional space is a direction of the first object in length, width, and height of the first object, and the key position in the three-dimensional space is a preset position of the first object, or a central axis position of the first object.

In this embodiment of the present disclosure, the lengths of the first object and the second object only at the key position and in the key direction are compared, which is simpler and has a faster calculation speed when compared with the previous embodiment.

In the previous embodiment, the lengths of the first object and the second object at all the positions and in all the directions are compared, which has a more complex calculation and a slower calculation speed, but has higher calculation precision.

In the embodiments of the present disclosure, a manner of generating the touch sensation signal includes the foregoing implementation manners, and variations of this implementation manner, and other implementation manners of comparing the first object and the second object.

In an embodiment of the present disclosure, generating the touch sensation signal using the parameter information of the touch sensation signal, and applying the touch sensation signal to the first object includes generating the touch sensation signal using the parameter information of the touch sensation signal, and applying the touch sensation signal to the first object using a touch sensation generation apparatus.

In an embodiment of the present disclosure, the first object is a foot, the second object is a shoe, and the touch sensation generation apparatus is a foot strap apparatus.

In this embodiment of the present disclosure, an image of a foot of a purchaser is collected, information about a wearable item for purchasing a shoe is acquired, a signal that simulates a touch sensation when the shoe is worn on the foot of the purchaser is generated, and the touch sensation signal is applied to the purchaser. In this embodiment of the present disclosure, an image of the purchaser is collected, the purchaser does not need to wear the shoe, and a signal that simulates a touch sensation can be generated. A purchasing procedure of the purchaser is simplified, and damage to the item for purchasing the shoe is reduced.

In an embodiment of the present disclosure, the first object is a hand, the second object is a glove, and the touch sensation generation apparatus is a glove apparatus.

In this embodiment of the present disclosure, an image of a hand of a purchaser is collected, information about a wearable item for purchasing a glove is acquired, a signal that simulates a touch sensation when the glove is worn on the hand of the purchaser is generated, and the touch sensation signal is applied to the purchaser. In this embodiment of the present disclosure, an image of the purchaser is collected, the purchaser does not need to wear the glove, and a signal that simulates a touch sensation can be generated. A purchasing procedure of the purchaser is simplified, and damage to the item for purchasing, the glove, is reduced.

In an embodiment of the present disclosure, the first object is a head, the second object is a hat, and the touch sensation generation apparatus is a hat apparatus.

In this embodiment of the present disclosure, an image of a head of a purchaser is collected, information about a wearable item for purchasing a hat is acquired, a signal that simulates a touch sensation when the hat is worn on the head of the purchaser is generated, and the touch sensation signal is applied to the purchaser. In this embodiment of the present disclosure, an image of the purchaser is collected, the purchaser does not need to wear the hat, and a signal that simulates a touch sensation can be generated. A purchasing procedure of the purchaser is simplified, and damage to the item for purchasing, the hat, is reduced.

In the embodiments of the present disclosure, a product for purchasing includes, but is not limited to, a shoe, a hat, and a glove, and further includes other wearable products, such as a finger ring, stockings, and clothes.

In an embodiment of the present disclosure, the touch sensation generation apparatus includes a touch sensation signal contact surface and a touch sensation simulation module. The touch sensation simulation module generates through simulation a touch sensation strength signal according to the parameter of the touch sensation signal, and applies, using the touch sensation signal contact surface, the touch sensation signal to an object to which a touch sensation is applied.

In an embodiment of the present disclosure, the touch sensation simulation module is implemented using a touch sensation control fluid, the touch sensation control fluid is included in the touch sensation signal contact surface, and the touch sensation signal is applied, using the touch sensation signal contact surface, to the object to which a touch sensation is applied. The touch sensation generation apparatus controls a touch sensation fluid according to the parameter of the touch sensation signal, such as a shape, a density, and the like of the touch sensation fluid to control a touch sensation of the object to which a touch sensation is applied. The touch sensation simulation module may also be an analogue of the touch sensation control fluid, and another device that can simulates a touch sensation.

In an embodiment of the present disclosure, generating the touch sensation signal using the parameter information of the touch sensation signal, and applying the touch sensation signal to the first object includes generating the touch sensation signal using the parameter information of the touch sensation signal, and applying the touch sensation signal to the first object using an ultrasonic wave generation apparatus.

In an embodiment of the present disclosure, the image of the first object includes two-dimensional images, collected from multiple angles, of the first object, or a depth map of the first object.

Figure 5:
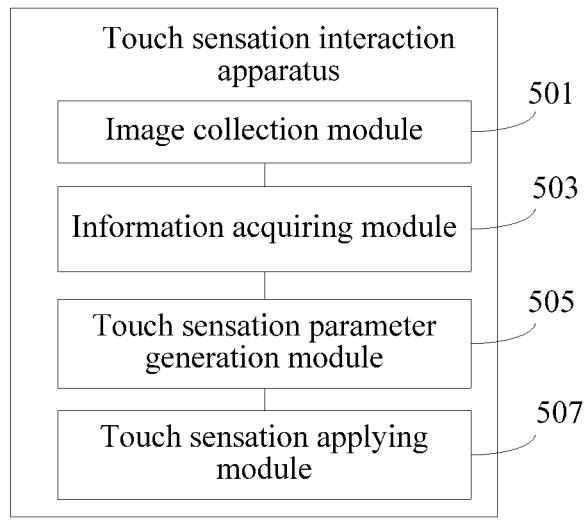
FIG. 5 is a schematic structural diagram of an embodiment of a touch sensation interaction apparatus in shopping according to the present disclosure.

An embodiment of the present disclosure provides a touch sensation interaction apparatus in shopping. FIG. 5 provides a schematic diagram of an embodiment of a touch sensation interaction apparatus in shopping according to the present disclosure. The apparatus includes an image collection module 501, an information acquiring module 503, a touch sensation parameter generating module 505, and a touch sensation applying module 507, where the image collection module 501 is configured to collect an image of a first object, where the first object is a part of a human body, the information acquiring module 503 is configured to acquire information about a second object, where the second object is a wearable item worn by the first object, the touch sensation parameter generating module 505 is configured to obtain parameter information of a touch sensation signal using the image of the first object and the information about the second object, where the touch sensation signal is applied to the first object and is used to simulate a touch sensation caused by the second object to the first object when the second object is worn by the first object, and the touch sensation applying module 507 is configured to generate the touch sensation signal using the parameter information of the touch sensation signal, and apply the touch sensation signal to the first object.

This embodiment of the present disclosure provides a touch sensation interaction apparatus in shopping, where the touch sensation parameter generating module is configured to obtain a model function of the first object using the image of the first object, obtain a model function of the second object using the information about the second object, and obtain through calculation, using the model function of the first object and the model function of the second object and using a model matching algorithm, a function representing the touch sensation signal.

In an embodiment of the present disclosure, the touch sensation parameter generating module is configured to acquire through scanning, using the image of the first object, lengths of the first object in all directions and at all positions in three-dimensional space, acquire, using the information about the second object, lengths of the second object in all directions and at all positions in the three-dimensional space, and separately compare the lengths of the first object in all the directions and at all the positions in the three-dimensional space with the lengths of the second object in all the directions and at all the positions in the three-dimensional space, and determine to obtain direction and position information and a length difference amplitude when the length of the second object is less than or equal to the length of the first object, to generate the parameter information of the touch sensation signal, where the parameter information of the touch sensation signal includes a position, an amplitude, and a direction of the touch sensation signal.

In an embodiment of the present disclosure, the touch sensation parameter generating module is configured to acquire through scanning, using the image of the first object, lengths of the first object in a key direction and at a key position in three-dimensional space, acquire, using the information about the second object, lengths of the second object in all directions and at all positions in the three-dimensional space, and separately compare the lengths of the first object in the key direction and at the key position in the three-dimensional space with lengths of the second object in a key direction and at a key position of length, width, and height, and determine to obtain direction and position information and a length difference amplitude when the length of the second object is less than or equal to the length of the first object, to generate the parameter information of the touch sensation signal, where the parameter information of the touch sensation signal includes a position, an amplitude, and a direction of the touch sensation signal.

In an embodiment of the present disclosure, the touch sensation applying module is configured to generate the touch sensation signal using the parameter information of the touch sensation signal, and apply the touch sensation signal to the first object using a touch sensation generation apparatus.

In an embodiment of the present disclosure, the first object is a foot, the second object is a shoe, and the touch sensation generation apparatus is a foot strap apparatus.

In an embodiment of the present disclosure, the first object is a hand, the second object is a glove, and the touch sensation generation apparatus is a glove apparatus.

In an embodiment of the present disclosure, the first object is a head, the second object is a hat, and the touch sensation generation apparatus is a hat apparatus.

Figure 6:
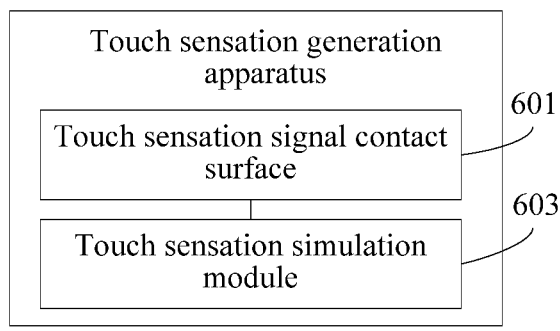
FIG. 6 is a schematic structural diagram of an embodiment of a touch sensation generation apparatus according to the present disclosure.
Figure 7:
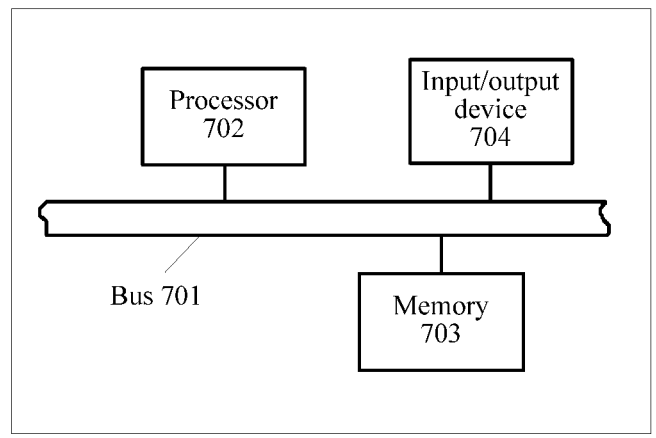
FIG. 7 is a schematic structural diagram of a touch sensation interaction computer system in shopping according to the present disclosure.

In an embodiment of the present disclosure, an embodiment of the touch sensation generation apparatus is provided. FIG. 6 provides a schematic diagram of an embodiment of the touch sensation generation apparatus in shopping according to the present disclosure. The touch sensation generation apparatus includes a touch sensation signal contact surface 601 and a touch sensation simulation module 603, where the touch sensation simulation module generates through simulation the touch sensation signal according to a parameter of the touch sensation signal, and applies, using the touch sensation signal contact surface, the touch sensation signal to an object to which a touch sensation is applied.

In an embodiment of the present disclosure, the touch sensation generation apparatus includes generating the touch sensation signal using the parameter information of the touch sensation signal, and applying the touch sensation signal to the first object using an ultrasonic wave generation apparatus.

In an embodiment of the present disclosure, the image of the first object includes two-dimensional images, collected from multiple angles, of the first object, or a depth map of the first object.

An embodiment of the present disclosure provides a touch sensation interaction computer system in shopping, where the computer system includes a bus 701, a processor 702, a memory 703, and an input/output device 704, where the processor, the memory, and the input/output device are connected using the bus, the memory is configured to store data and code, the processor is coupled with the memory, and implements the following method by invoking the data and code in the memory: collecting an image of a first object, where the first object is a part of a human body, acquiring information about a second object, where the second object is a wearable item worn by the first object, obtaining parameter information of a touch sensation signal using the image of the first object and the information about the second object, where the touch sensation signal is applied to the first object and is used to simulate a touch sensation caused by the second object to the first object when the second object is worn by the first object, and generating the touch sensation signal using the parameter information of the touch sensation signal, and applying the touch sensation signal to the first object.

In an embodiment of the present disclosure, the input/output device 704 includes a text input device such as a keyboard, a touchscreen, and a mouse, a camera, a touch sensation applying module, and the like. The processor that is coupled with the memory is further configured to invoke program or data in the memory to control the camera to acquire the image of the first object, where the first object is a part of the human body, and control the touch sensation applying module to apply the touch sensation signal to the first object.

A person skilled in the art may understand that the accompanying drawings are merely schematic diagrams of exemplary embodiments, and modules or processes in the accompanying drawings are not necessarily required for implementing the present disclosure.

A person skilled in the art may understand that the modules in the apparatuses provided in the embodiments may be distributed in the apparatuses in the embodiments according to the description of the embodiments, or may be correspondingly changed to be located in one or more apparatuses which are different from those described in the embodiments. The modules in the foregoing embodiments may be combined into one module, or split into multiple submodules.

What is claimed is:

1. A touch sensation interaction method in shopping, wherein the method comprises:
   collecting an image of a first object, wherein the first object is a part of a human body;
   acquiring information about a second object, wherein the second object is a wearable item worn by the first object;
   obtaining parameter information of a touch sensation signal using the image of the first object and the information about the second object, wherein the touch sensation signal is applied to the first object and is used to simulate a touch sensation caused by the second object to the first object when the second object is worn by the first object;
   generating the touch sensation signal using the parameter information of the touch sensation signal based on a comparison of a plurality of lengths of the first object in a plurality of different directions and a plurality of lengths of the second object in the plurality of different directions; and
   applying the touch sensation signal to the first object.

2. The method according to claim 1, wherein obtaining the parameter information of the touch sensation signal using the image of the first object and the information about the second object comprises:
   obtaining a model function of the first object using the image of the first object;
   obtaining a model function of the second object using the information about the second object; and
   obtaining through calculation, using the model function of the first object and the model function of the second object, and using a model matching algorithm, a function representing the touch sensation signal.

3. The method according to claim 1, wherein generating the parameter information of the touch sensation signal using the image of the first object and the information about the second object comprises:
acquiring, through scanning and using the image of the first object, a plurality of lengths of the first object in all directions and at all positions in three-dimensional space;
acquiring, using the information about the second object, a plurality of lengths of the second object in all directions and at all positions in the three-dimensional space;
separately comparing the plurality of lengths of the first object in all the directions and at all the positions in the three-dimensional space with the plurality of lengths of the second object in all the directions and at all the positions in the three-dimensional space, and
determining to obtain direction and position information and a length difference amplitude to generate the parameter information of the touch sensation signal when the length of the second object is less than or equal to the length of the first object, wherein the parameter information of the touch sensation signal comprises a position, an amplitude, and a direction of the touch sensation signal.

4. The method according to claim 1, wherein generating parameter information of the touch sensation signal using the image of the first object and the information about the second object comprises:
acquiring, through scanning and using the image of the first object, a plurality of lengths of the first object in a key direction and at a key position in three-dimensional space;
acquiring, using the information about the second object, a plurality of lengths of the second object in all directions and at all positions in the three-dimensional space;
separately comparing the plurality of lengths of the first object in the key direction and at the key position in the three-dimensional space with the plurality of lengths of the second object in a key direction and at a key position of length, width, and height, and
determining to obtain direction and position information and a length difference amplitude to generate the parameter information of the touch sensation signal when the length of the second object is less than or equal to the length of the first object, wherein the parameter information of the touch sensation signal comprises a position, an amplitude, and a direction of the touch sensation signal.

5. The method according to claim 1, wherein the touch sensation signal is applied to the first object using a processor of a touch sensation generation apparatus.

6. The method according to claim 5, wherein the touch sensation generation apparatus comprises:
a touch sensation signal contact surface; and
the processor,
wherein applying the touch sensation signal to the first object using the processor of the touch sensation generation apparatus comprises:
generating through simulation by the processor, the touch sensation signal according to a parameter of the touch sensation signal; and
applying, using the touch sensation signal contact surface, the touch sensation signal to an object to which a touch sensation is applied.

7. The method according to claim 1, wherein the touch sensation signal is applied to the first object using an ultrasonic wave generation apparatus.

8. The method according to claim 1, wherein the image of the first object comprises at least one of two-dimensional images collected from multiple angles of the first object and a depth map of the first object.

9. A touch sensation interaction apparatus in shopping, wherein the apparatus comprises:
a memory comprising instructions; and
a processor configured to execute the instructions, which causes the processor to be configured to:
collect an image of a first object, wherein the first object is a part of a human body;
acquire information about a second object, wherein the second object is a wearable item worn by the first object;
obtain parameter information of a touch sensation signal using the image of the first object and the information about the second object, wherein the touch sensation signal is applied to the first object and is used to simulate a touch sensation caused by the second object to the first object when the second object is worn by the first object;
generate the touch sensation signal using the parameter information of the touch sensation signal based on a comparison of a plurality of lengths of the first object in a plurality of different directions and a plurality of lengths of the second object in the plurality of different directions; and
apply the touch sensation signal to the first object.

10. The apparatus according to claim 9, wherein the processor is further configured to:
obtain a model function of the first object using the image of the first object;
obtain a model function of the second object using the information about the second object; and
obtain through calculation, using the model function of the first object and the model function of the second object, and using a model matching algorithm, a function representing the touch sensation signal.

11. The apparatus according to claim 10, wherein the processor is further configured to:
acquire, through scanning and using the image of the first object, a plurality of lengths of the first object in all directions and at all positions in three-dimensional space;
acquire, using the information about the second object, a plurality of lengths of the second object in all directions and at all positions in the three-dimensional space;
separately compare the plurality of lengths of the first object in all the directions and at all the positions in the three-dimensional space with the plurality of lengths of the second object in all the directions and at all the positions in the three-dimensional space, and
determine to obtain direction and position information and a length difference amplitude to generate the parameter information of the touch sensation signal when the length of the second object is less than or equal to the length of the first object, wherein the parameter information of the touch sensation signal comprises a position, an amplitude, and a direction of the touch sensation signal.

12. The apparatus according to claim 10, wherein the processor is further configured to:
  acquire, through scanning and using the image of the first object, a plurality of lengths of the first object in a key direction and at a key position in three-dimensional space;
  acquire, using the information about the second object, a plurality of lengths of the second object in all directions and at all positions in the three-dimensional space;
  separately compare the plurality of lengths of the first object in the key direction and at the key position in the three-dimensional space with the plurality of lengths of the second object in a key direction and at a key position of length, width, and height, and
  determine to obtain direction and position information and a length difference amplitude to generate the parameter information of the touch sensation signal when the length of the second object is less than or equal to the length of the first object, wherein the parameter information of the touch sensation signal comprises a position, an amplitude, and a direction of the touch sensation signal.

13. The apparatus according to claim 9, wherein the touch sensation signal is applied to the first object using a second processor of a touch sensation generation apparatus.

14. The apparatus according to claim 13, wherein the touch sensation generation apparatus comprises a touch sensation signal contact surface, wherein the second processor is further configured to:
  generate through simulation, the touch sensation signal according to a parameter of the touch sensation signal; and
  apply, using the touch sensation signal contact surface, the touch sensation signal to an object to which a touch sensation is applied.

15. The apparatus according to claim 9, wherein the image of the first object comprises at least one of two-dimensional images collected from multiple angles of the first object, and a depth map of the first object.

16. A touch sensation interaction computer system in shopping, wherein the computer system comprises:
  a bus;
  a processor;
  a memory; and
  an input/output device,
  wherein the processor, the memory, and the input/output device are coupled together using the bus,
  wherein the memory is configured to store data and code and
  wherein the processor is configured to implement the following method by invoking the data and code in the memory:
    collecting an image of a first object, wherein the first object is a part of a human body;
    acquiring information about a second object, wherein the second object is a wearable item worn by the first object;
    obtaining parameter information of a touch sensation signal using the image of the first object and the information about the second object, wherein the touch sensation signal is applied to the first object and is used to simulate a touch sensation caused by the second object to the first object when the second object is worn by the first object;
    generating the touch sensation signal using the parameter information of the touch sensation signal based on a comparison of a plurality of lengths of the first object in a plurality of different directions and a plurality of lengths of the second object in the plurality of different directions; and
    applying the touch sensation signal to the first object.

* * * * *